United States Patent [19]
Rabideau et al.

[11] Patent Number: 4,885,771
[45] Date of Patent: Dec. 5, 1989

[54] INFORMATION STORAGE SYSTEM

[75] Inventors: Brian Rabideau; William D. Laughlin, both of St. Catharines; Kenneth Kissman, Welland; Anthony T. Nicowski, St. Catharines, all of Canada

[73] Assignee: Vision II Technology Inc., St. Catharines, Canada

[21] Appl. No.: 184,417

[22] Filed: Apr. 21, 1988

[51] Int. Cl.[4] ............................................. H04M 1/27
[52] U.S. Cl. .................................. 379/354; 379/355; 379/216
[58] Field of Search ............... 379/354, 355, 356, 357, 379/359, 216

[56] References Cited
U.S. PATENT DOCUMENTS 4,291,198  9/1981  Anderson et al. ............... 379/354 X
4,709,387  11/1987  Masuda ............................... 379/354

FOREIGN PATENT DOCUMENTS 0194860  10/1985  Japan ................................... 379/354

Primary Examiner—James L. Dwyer
Attorney, Agent, or Firm—Rogers & Scott

[57] ABSTRACT

There is provided an information storage system for use in the storage of telephone numbers and the automatic dialling of selected telephone numbers. The system comprises a memory adapted for containing information including a plurality of designations and an associated telephone number, and a display for the display of selected information extracted from the memory. Operator input keys are provided for initially selecting information from the memory comprising a list of designations which are presented on the display. The operator input keys may then be used for further selecting a single designation from the displayed list. A telephone dialler is provided for dialling the telephone number associated with the selected designation and a telephone line interface is provided for linking the telephone dialler to a telephone line and a host telephone.

7 Claims, 10 Drawing Sheets

INFORMATION STORAGE SYSTEM

FIELD OF INVENTION

This invention relates to information storage systems and more particularly to information storage systems for use in conjunction with telephones for storing telephone numbers and additional information, and for automatically dialling and displaying selected telephone numbers.

At present many telephones include memories for storing frequently used telephone numbers. The numbers are usually identified by numerical codes which the operator must input to activate the telephone to dial the stored number. However, this form of memory system requires a hard copy, relating numerical codes to particular names or designations, to be kept near the telephone to act as a reference guide should the operator not be familiar with the codes. Quite often this hard copy is in the form of a reference card which is placed in a display portion on an upper face of the telephone. However, the amount of information which can be contained on such a reference card is limited and the appearance of the telephone may also suffer as corrections and alterations are made to the telephone memory, requiring corresponding amendments to be made to the card.

SUMMARY OF INVENTION

Accordingly, it is one object of the present invention to overcome these disadvantages by providing an information storage system for use with a telephone which enables a relatively large number of telephone numbers to be stored and referenced while dispensing with the need for reference codes and the corresponding hard copies relating the codes to the stored information.

It is a further object of the present invention to provide an information storage system for use with a telephone which can be used to store further information in addition to names or designations and associated telephone numbers.

In one aspect of the present invention there is provided an information storage system for use in the storage of telephone numbers and the automatic dialling of selected telephone numbers. The system comprises information storage means adapted for containing information including a plurality of designations and an associated telephone number, and display means for the display of selected information from the information storage means. Operator input means are provided for initially selecting information from the information storage means comprising a list of designations which are displayed on the display means. The operator input means may then be used for further selecting a single designation from the displayed list. Telephone dialling means are provided for dialling the telephone number associated with the selected designation and telephone line interface means are provided for linking the telephone dialling means to a telephone line and a host telephone.

BRIEF DESCRIPTION OF THE DRAWINGS

This and other aspects of the present invention will now be described, by way of example, with reference to the accompanying drawings, in which.

Figure 1:
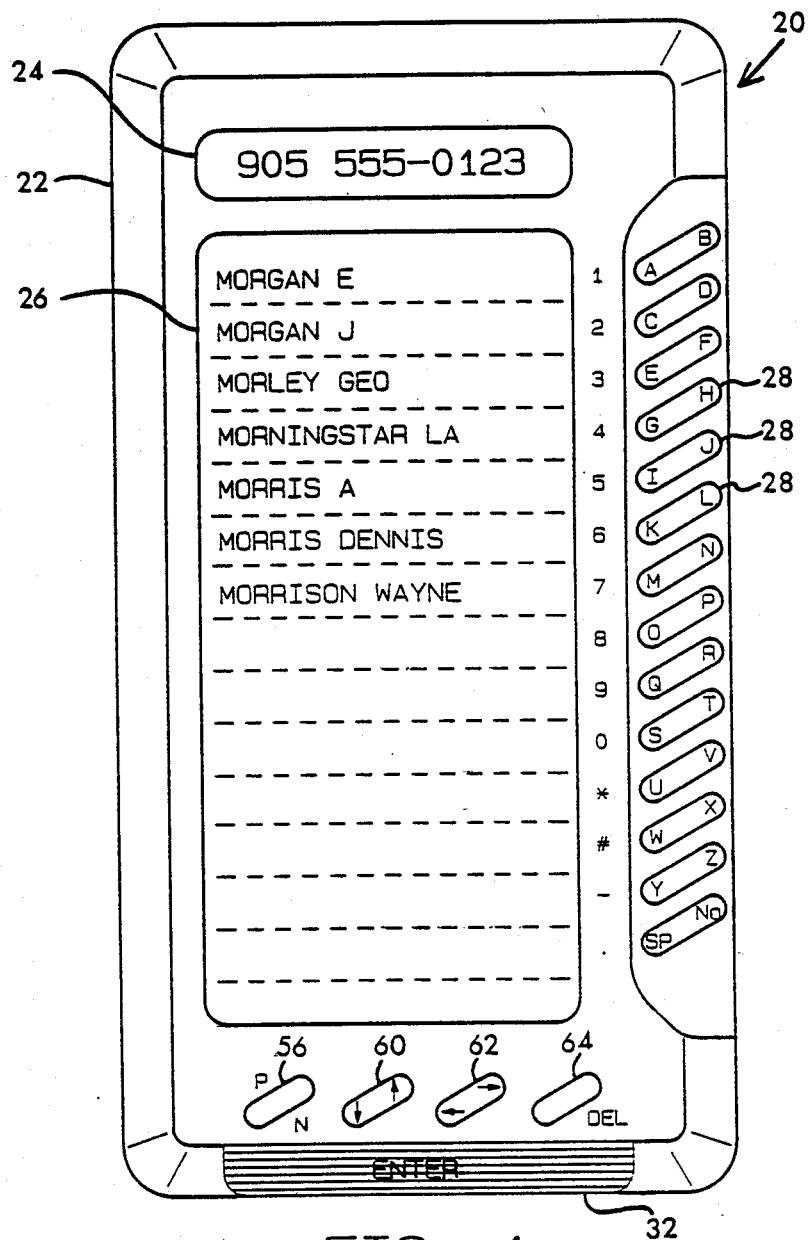
FIG. 1 is a plan view of a unit containing an information storage system in accordance with a preferred embodiment of the present invention.

Reference is first made to FIG. 1 which illustrates a unit 20 containing an information storage system in accordance with a preferred embodiment of the present invention. The unit includes a housing 22 which is sized and coloured to match the telephone with which the unit is intended to be used and is conveniently constructed of plastic moldings. The upper face of the housing 22 is generally planar and includes two rectangular screens 24, 26 comprising Liquid Crystal Display (LCD) units. The first screen 24 is relatively small and is capable of displaying a single line of information, such as a telephone number. The second screen 26 is somewhat larger and may display up to fourteen separate lines of information, such as a list of names as is illustrated in FIG. 1.

The right hand side of the upper face of the unit 20 includes a row of fourteen toggle keys 28, each associated with one of the lines of the screen 26. These keys 28 will be described as the alpha keys and their function will be described when the operation of the system is described below.

Four further toggle keys 30 are provided at the base of the screen 26, and a larger treadle key 32, which serves as an "ENTER" key is located below the keys 30 at the bottom edge of the housing 22. The functions of these various keys 30, 32 will also be described below.

Figure 2:
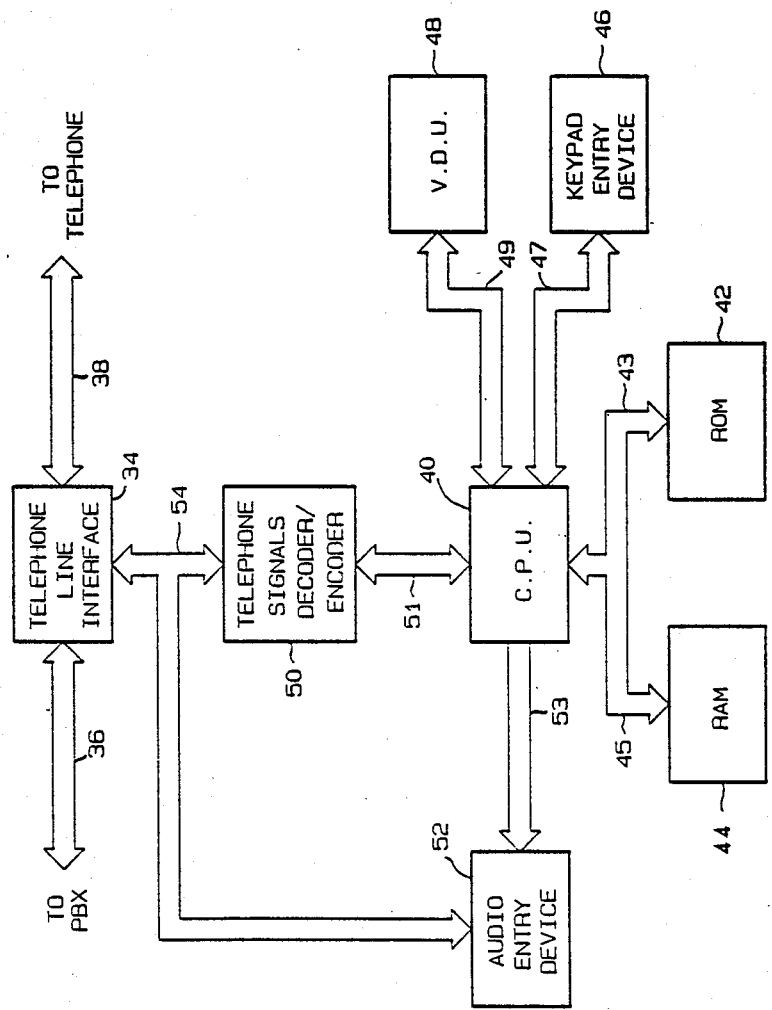
FIG. 2 is a block diagram representing the information storage system contained within the unit of FIG. 1.

Reference is now made to FIG. 2 of the drawings which is a block diagram illustrating the various components of the system contained within the unit 20. External telephone calls directed to the host telephone enter the telephone line interface 34 through a standard analog PBX communication line 36, the telephone line interface 34 being arranged such that the signal from the line 36 is continued and transferred uninterrupted to the host telephone through a standard analog telephone line 38. The telephone line interface 34 is simply a line matching transformer having a ratio of one to one, and also allows signals from the host telephone to pass without interruption from the telephone line 38 to the communication line 36.

Control of the system is achieved by a central processing unit (CPU) 40 comprising a microprocessor such as an Intel 8085 and several support ICs. Typically, an 8212 could be used for Address/Data bus decoding, an 8155 or 8152 could be used for general input and output activities for external devices and accessories, and a 74138 could be used for chip and IC enabling.

All system control programs and other information such as names and designations, associated telephone numbers and addresses, is contained within the memory units 42, 44 linked to the CPU through digital lines 43, 45. The ROM memory unit 42 contains the programming information, and the RAM unit 44 contains any information input by the operator. For the operation of the system as will be described, 8 kilobytes of ROM and 250 kilobytes of RAM are required. To ensure that the RAM memory does not lose its data in the event of power loss, non-volatile RAM chips may be used, or alternatively a battery backup system may be provided.

The memory units may be formed from any suitable well known ICs, including 4164, 41256, 41464, 6264, 2816, 2864, and 2865.

Selections of telephone numbers are made from the RAM by use of the various keys 28, 30, 32, which are debounced and decoded using conventional TTL and CMOS technology and are represented collectively in FIG. 2 by the keypad entry device 46, interacting with the screens 24, 26, illustrated collectively in FIG. 2 as the visual display unit (VDU) 48. The keypad device 46 and the VDU 48 are linked to the CPU 40 by respective digital lines 47 and 49.

When a telephone number has been selected from the RAM 44 the CPU 40 passes the signal representative of the telephone number to the telephone signal decoder/encoder 50, which is linked to the CPU by digital line 51. The decoder/encoder is formed of a 565 telephone signal decoder and 567 telephone signal encoder which, if desired, may be combined into the one part. The encoder/decoder 50 then generates the appropriate pulse tones corresponding to the telephone number extracted from the RAM 44. These signals are passed to the PBX communication line 36 through the telephone line interface and call the chosen telephone number. As the telephone number is being dialled, an audio generation device 52 linked to the decoder/encoder 50 generates pulse tones. The audio generation device is also linked to the CPU to produce sounds as the operator inputs information into the RAM.

The power supply for the system is conveniently in the form of a single supply voltage of 12 Volts DC derived from a 110 Volt AC mains supply.

The operation of the system will now be described with reference to FIGS. 3 to 6, which illustrate, by means of flowcharts, the operations which an operator may carry out in each of the four available operating modes of the system.

Select Mode

Figure 3:
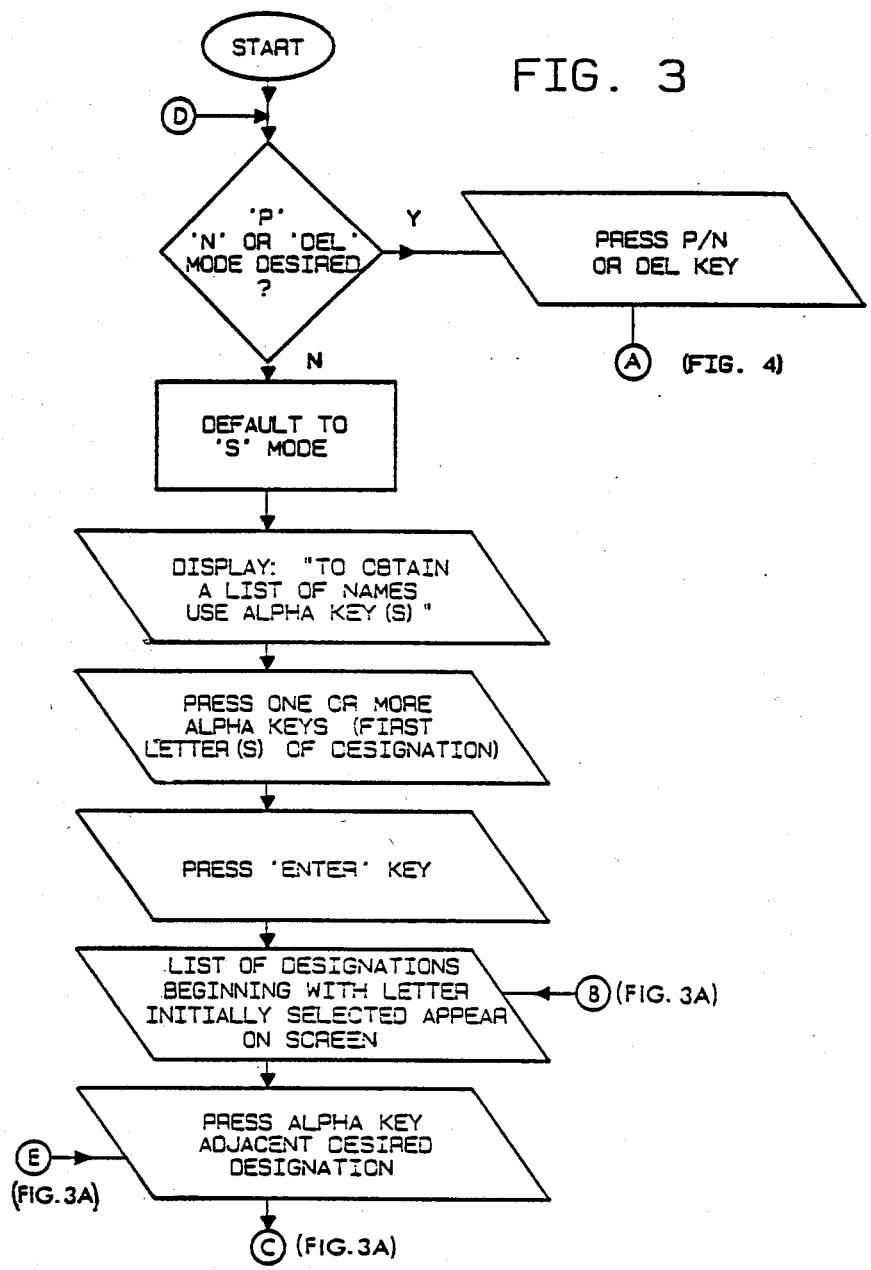
FIGS. 3, 3A, 4, 4A, 5, 5A, 6, 6A are flow charts illustrating the operation of the system.
Figure 3A:
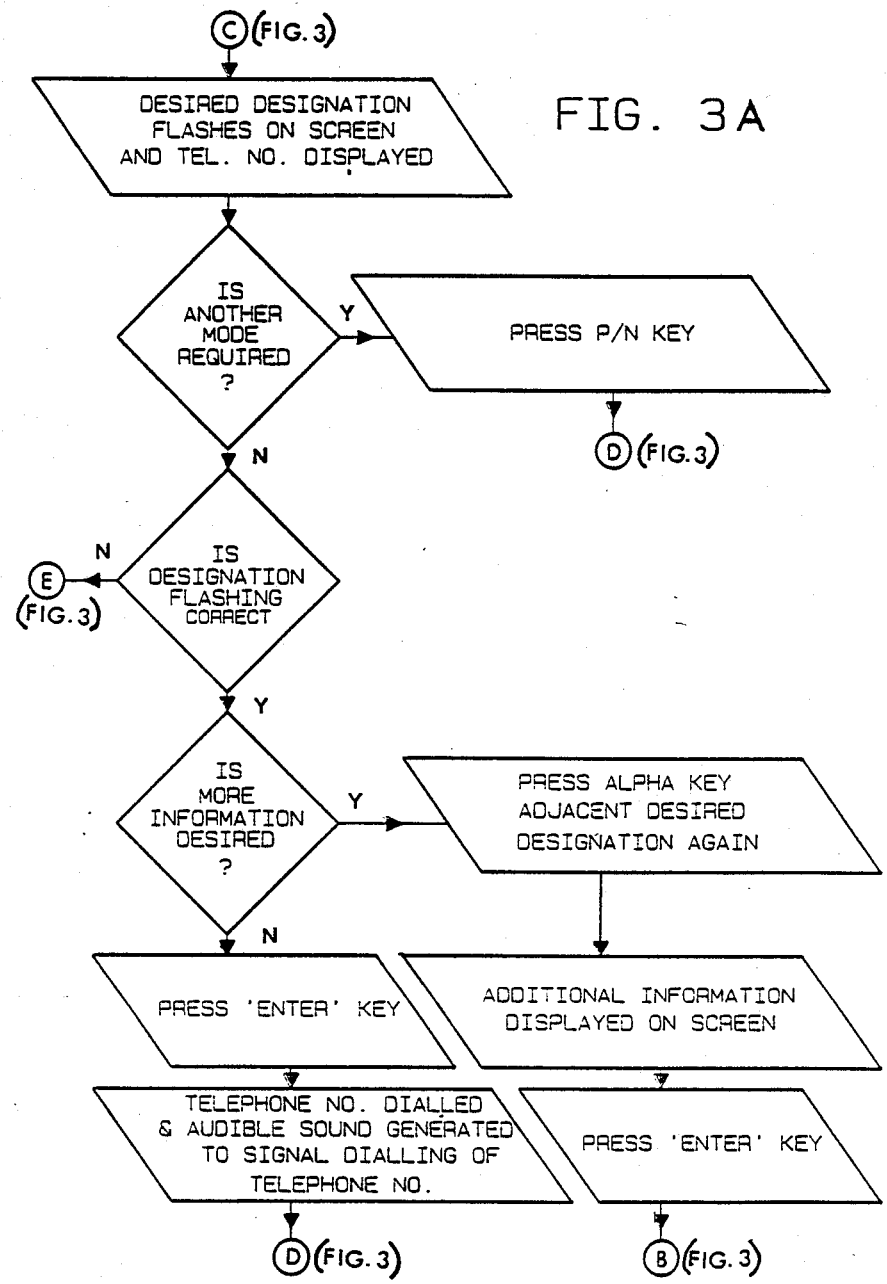

Reference is first made to FIG. 3 of the drawings which illustrates the operational flowchart for the select mode of the system. This is the normal default mode of the system and is used when it is desired to call a telephone number stored in the unit. Normally the large screen 26 will display the initial instructions "TO OBTAIN A LIST OF NAMES USE ALPHA KEYS". The operator then presses one or more of the alpha keys 28 and the "ENTER" key 32 to obtain an initial display of previously entered names or designations having a corresponding telephone number stored in the memory of the unit. If, for example, the operator entered a single letter, the list displayed would comprise all of the name designations beginning with this letter. The display on FIG. 1 would indicate that the operator has input the letters M O R to obtain the list of names beginning with these letters.

Once the list is displayed on the screen 26 the operator then decides which one of the names he wishes to call and presses the alpha key associated with the line in which the desired name appears. This causes the chosen name to flash on screen and the telephone number associated with the name is displayed on the upper screen 24. At this point the operator may escape from the select mode by pressing a P/N function key 56 (FIG. 1). Also, if the designation which is flashing is not correct the operator simply presses the correct alpha key. Once it is ascertained that the correct designation is flashing the operator may obtain further previously entered information associated with the name by pressing the alpha key 28 on the same line as the designation for a second time. This causes the screen 26 to clear and display any additional information contained in memory relating to the designation. On pressing the ENTER key 32 the system returns to a display of the originally selected names. If, however, it is simply desired to call a telephone number the ENTER key 32 is pressed immediately it is ascertained that the correct designation is flashing, and the system automatically dials the selected telephone number, audible pulse tones, corresponding to the dialled number, being produced by the audio generation device 52 (FIG. 1).

Program Mode

Figure 4:
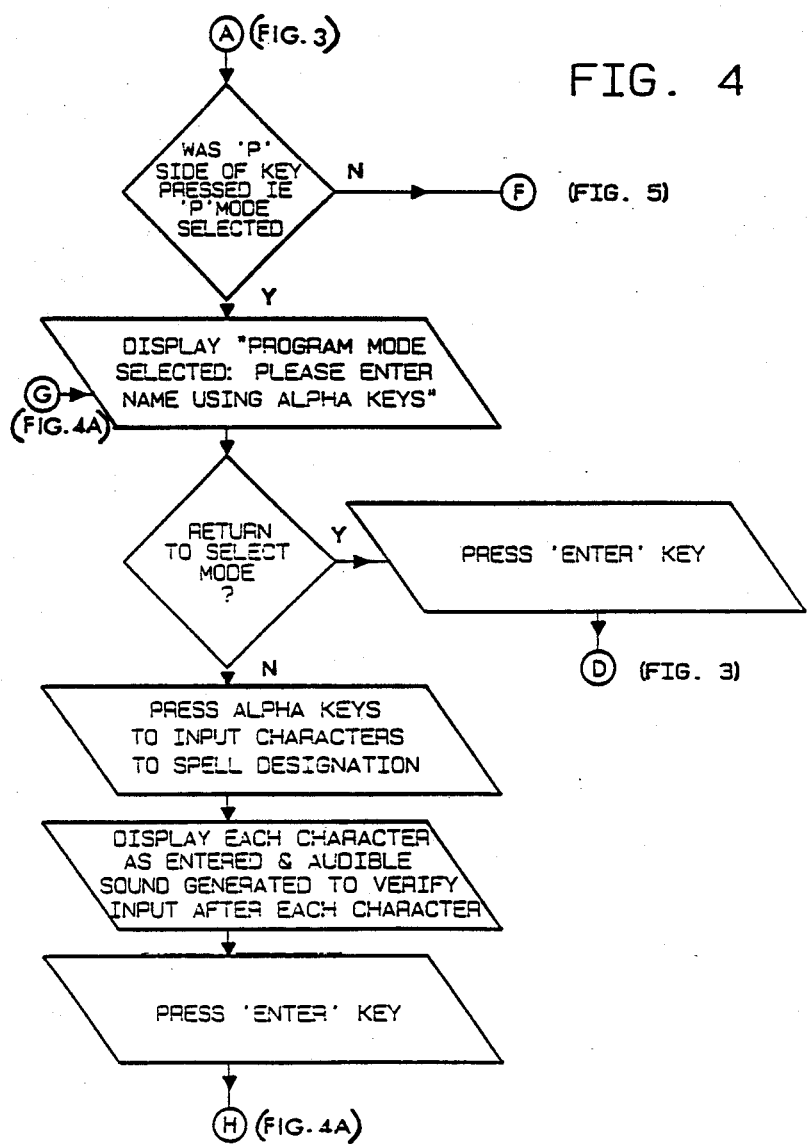
Figure 4A:
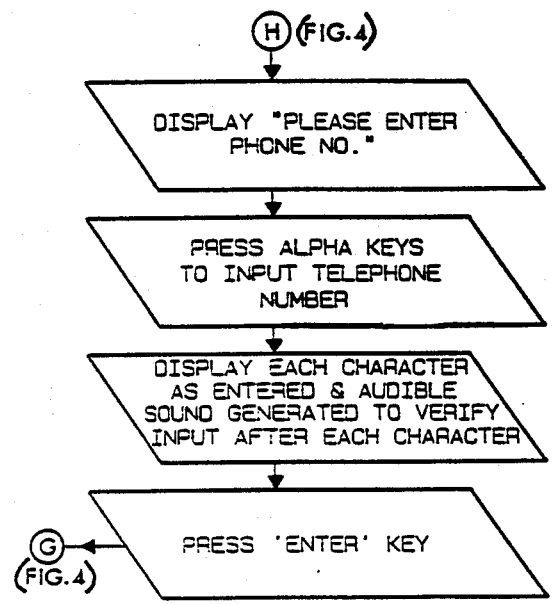

To input designations and associated telephone numbers into the system the program mode is used, and this is selected by pressing the "P" side of the P/N function key 56. The operation of the program mode is illustrated in FIG. 4 of the drawings. On selection of this mode the screen 26 displays "PROGRAM MODE SELECTED: PLEASE ENTER NAME USING ALPHA KEYS". At this point the operator may escape from the mode by pressing the ENTER key. Otherwise, the operator inputs the necessary characters by use of the alpha keys to spell a name or designation. Each character is displayed on the screen as it is entered and the audio generation device 52 produces a sound to verify each individual entry, the lowermost alpha key 58 being used to insert spaces and the middle two function keys 60, 62 being used to move a cursor on the screen 26. When the designation is complete the ENTER key is pressed and the display is cleared of the input, before displaying "PLEASE ENTER PHONE NUMBER". At this stage of the program mode, the alpha keys may be used to insert numerals corresponding to those shown to the left of the keys in FIG. 1, which appear on the upper screen 24 as they are entered. When all of the numbers have been input, the ENTER key is pressed and the program returns to the initial program mode display.

Program Note Mode

Figure 5:
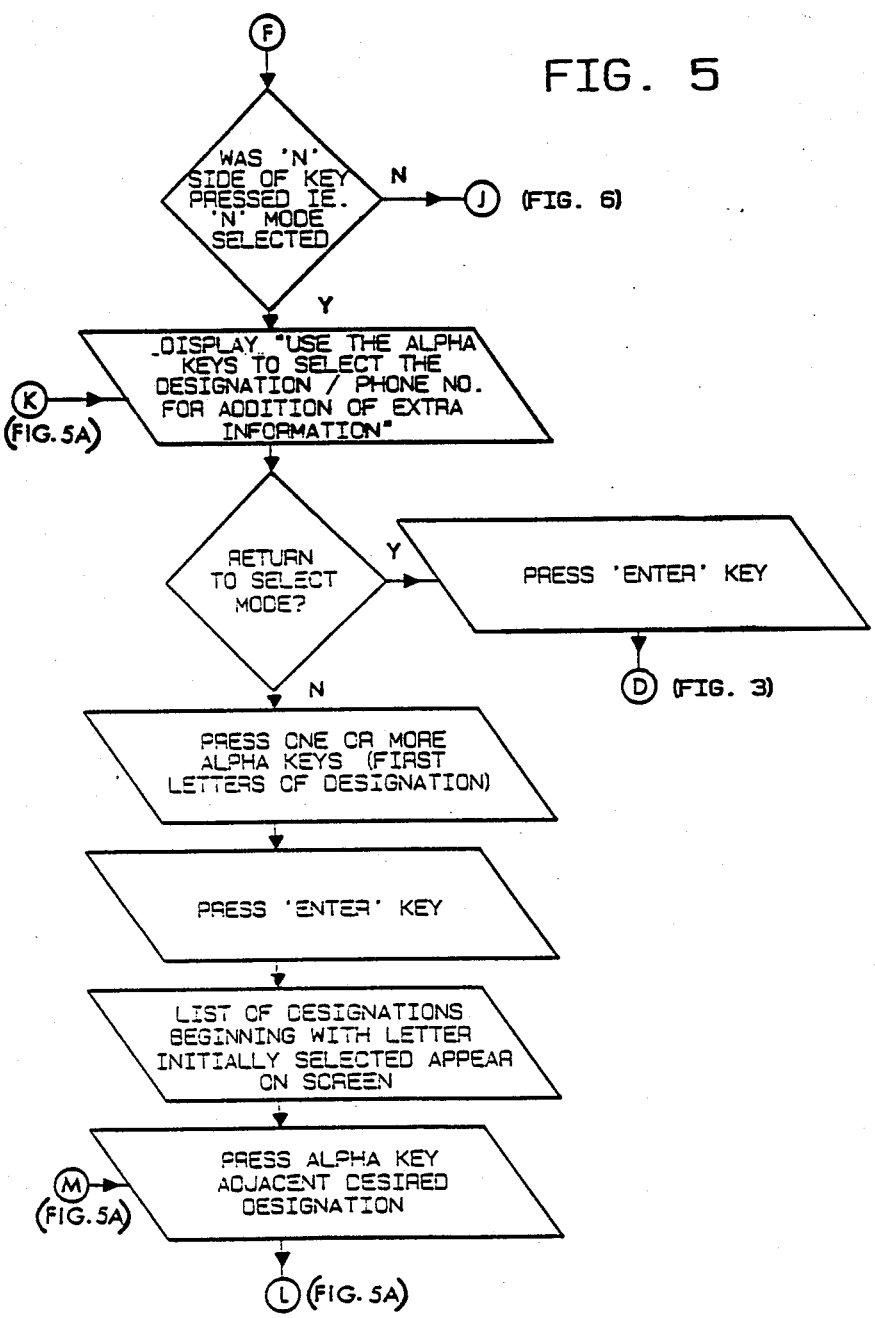
Figure 5A:
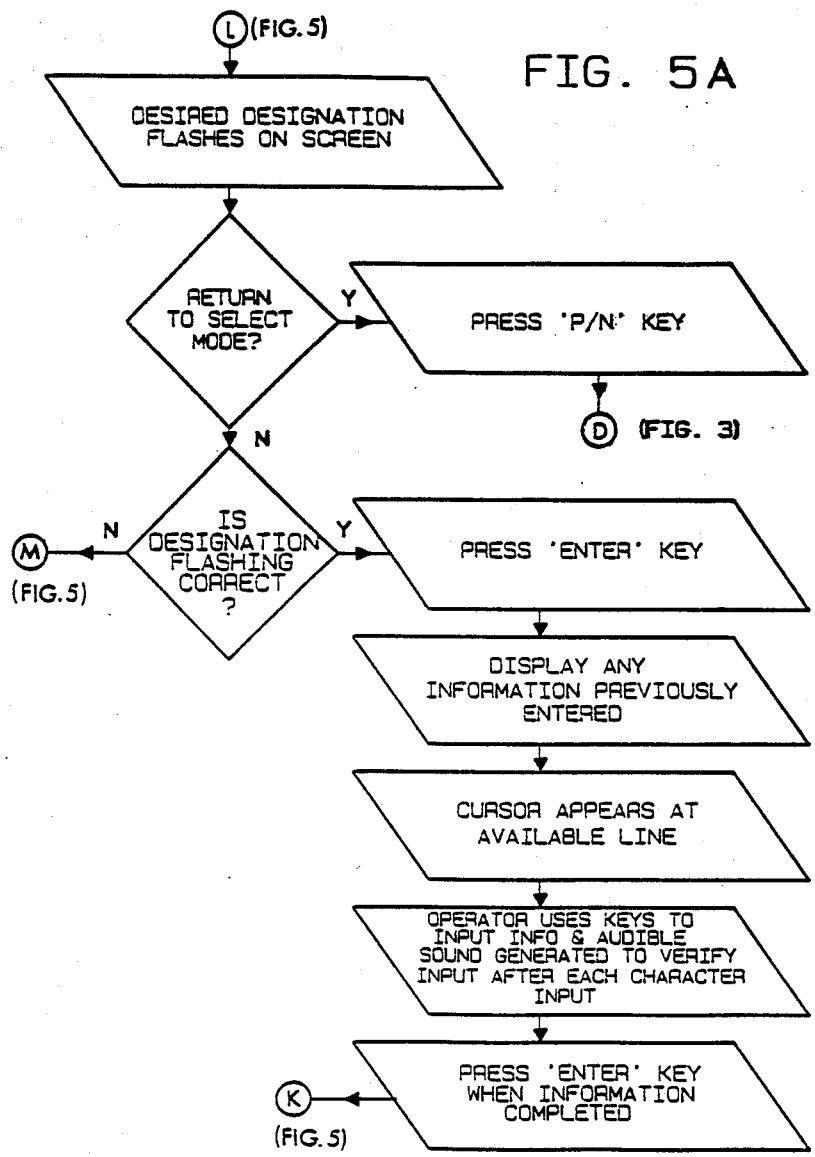

To enter information additional to a designation and telephone number, the program note mode is selected by pressing the N side of the P/N function key 56, and the operation of this mode is illustrated in FIG. 5 of the drawings. On initially entering the mode the screen 26 displays "USE THE ALPHA KEYS TO SELECT THE DESIGNATIONS/PHONE NUMBER FOR ADDITION OF EXTRA INFORMATION". At this point the operator may escape from the mode by pressing the ENTER key. Otherwise, the operator presses one or more of the alpha keys to bring up a list of designations in a similar manner to the select mode. The operator selects one of the designations by pressing the adjacent alpha key and the chosen designation then flashes on the screen. At this point the operator may escape from the mode or alternatively select another designation if the flashing designation is not correct. However, if the designation is correct the ENTER key is pressed and the screen clears to display any information that has been previously entered in association with the selected designation. The operator may create a new entry or add additional information to an existing memory by use of the alpha keys and the middle two function keys. When entering addresses, for example, it will be necessary to input both numerals and letters and for this reason the lowermost function key 58 may be used to change the function of the alpha keys from letters to numerals, or vice versa. When the entry is complete, the operator presses the ENTER key and the screen returns to the original program note mode display.

Delete Mode

Figure 6:
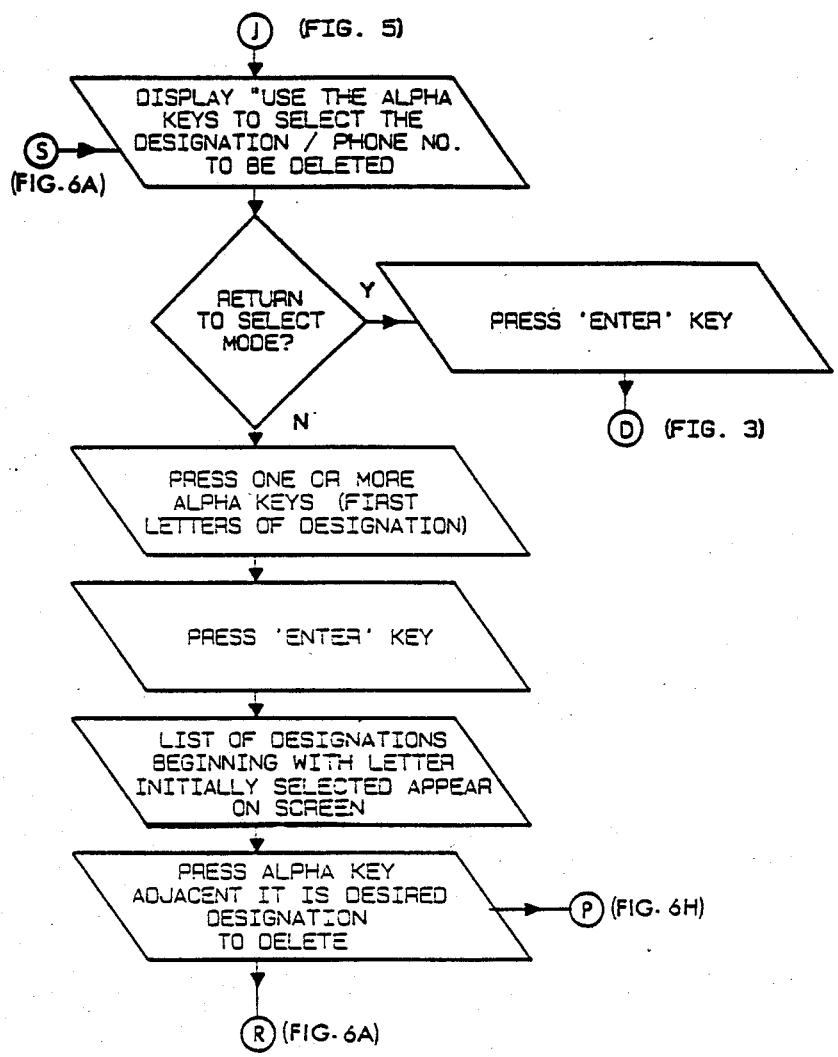
Figure 6A:
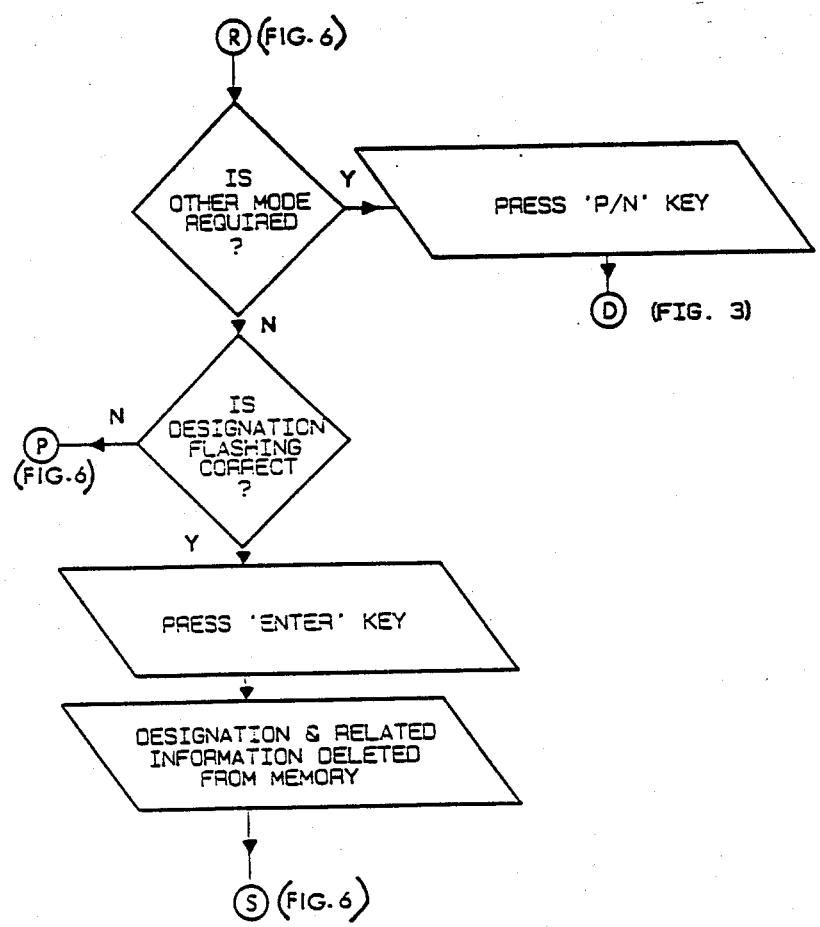

To delete information from the system memory, the delete mode is used and this is selected by pressing the DEL function key 64 and then following the process as illustrated in FIG. 6. Selection of a designation is carried out in a similar manner to the program and program note modes, though when the correct designation has been selected, pressing the ENTER key results in the designation, associated telephone number, and any additional associated information, being deleted from the memory.

Thus it can be seen that the information storage system of the present invention provides an easily operable telephone number and address storage system from which information may be easily accessed.

In a basic system costs may be minimized by limiting the memory storage for each letter of the alphabet to fourteen entries as can be displayed at one time on the screen 26. Alternatively, larger memory storage may be provided and additional operating controls provided such that several screens of information may be stored for each letter of the alphabet and in this case the function key 60 may be used to select next or previous screen.

Also, a speaker telephone may be included in the unit for voice communication free of the normal telephone handset after the unit has been used to place a call. Such "hands free" operation could be selected, for example, by use of function key 62 with volume control being achieved by use of function key 60.

It will be clear to those skilled in the art that the above description is merely exemplary of one embodiment of the present invention, to which various modifications and variations may be made without departing from the scope of the invention.

We claim:

1. An information storage system for the storage of a plurality of designations and associated respective telephone numbers, for the selection and display of selected designations having a common search parameter, for selection of an individual displayed designation and display of the respective telephone number, and for the automatic dialling of the displayed telephone number, the system comprising:

information storage means for storing a plurality of information designations and the respective telephone numbers;

search, select and retrieve means for searching the information storage means and retrieving therefrom a selected information designation or a plurality of selected information designations having a selected search parameter;

multiple-line display means for the display of the selected information designations having the common search parameter, each designation being displayed on a respective line;

multiple switch means having at least one line switch adjacent to and associated with each respective line of the display means, each line switch being enabled to select the respective line and an information designation displayed thereon, whereby upon such selection by actuation of the respective line switch the corresponding telephone number is displayed for inspection, the number of said line switches provided by the multiple switch means being at least ten and being related to the number of alphabetic characters in an alphabet required for production of the information designations;

program switch means which when operative enable the line switches as alphabetical input switches for entry of alphabetical information to the information storage means;

other switch means which when operative enable ten of the line switches as numerical input switches for entry of numerical information to the information storage means; and telephone dialling means operative in response to selection of an individual information designation to dial the telephone number corresponding to that designation.

2. A system as claimed in claim 1, wherein the number of display lines on the display means and the number of line switches provided for production of alphabetic information designations is at least equal to half the number of alphabetic characters required, and each line switch is a toggle switch operative in two alternative modes to provide the full number of line switches required for full alphabetic designation.

3. A system as claimed in claim 1, and including separate single line display means for display of a selected telephone number upon selection of the corresponding information designation by operation of the respective line switch.

4. A system as claimed in claim 2, and including separate single line display means for display of a selected telephone number upon selection of the corresponding information designation by operation of the respective line switch.

5. A system as claimed in claim 1, wherein the information storage means permits entry for each information designation in addition to the respective telephone number of additional information not accommodatable for display on a single line of the multiple-line display means, and the search select and retrieve means enables display of said additional information on other lines of the multi-line display means upon selection of the corresponding information designation.

6. A system as claimed in claim 2, wherein the information storage means permits entry for each information designation in addition to the respective telephone number of additional information not accommodatable for display on a single line of the multiple-line display means, and the search select and retrieve means enables display of said additional information on other lines of the multi-line display means upon selection of the corresponding information designation.

7. A system as claimed in claim 3, wherein the information storage means permits entry for each information designation in addition to the respective telephone number of additional information not accommodatable for display on a single line of the multiple-line display means, and the search select and retrieve means enables display of said additional information on other lines of the multi-line display means upon selection of the corresponding information designation.

* * * * *